(12) United States Patent
Sugata

(10) Patent No.: US 6,896,973 B2
(45) Date of Patent: May 24, 2005

(54) METHOD FOR MANUFACTURING A RECORDING MEDIUM

(75) Inventor: Yoshinobu Sugata, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 101 days.

(21) Appl. No.: 09/938,273

(22) Filed: Aug. 23, 2001

(65) Prior Publication Data

US 2002/0064688 A1 May 30, 2002

(30) Foreign Application Priority Data

Aug. 24, 2000 (JP) .......................................... 2000-254415

(51) Int. Cl.$^7$ ................................................. G11B 5/66
(52) U.S. Cl. ........................ 428/634 ST; 428/634 SL; 428/634 SG; 427/128; 427/129; 427/130; 204/192.34; 204/192.32
(58) Field of Search ..................... 428/634 ST, 634 SL, 428/634 SG, 900; 427/128–130; 204/192.34, 192.32

(56) References Cited

U.S. PATENT DOCUMENTS 5,601,883 A * 2/1997 Yamazaki .................... 427/577
5,895,558 A * 4/1999 Spence ........................ 204/165
6,416,633 B1 * 7/2002 Spence ........................ 204/156

FOREIGN PATENT DOCUMENTS

JP 5-143981 6/1993

* cited by examiner

Primary Examiner—Ieszek B Kiliman
(74) Attorney, Agent, or Firm—Darby & Darby

(57) ABSTRACT

A recording medium manufacturing method has a surface treatment process which removes contamination from a surface of a thermoplastic resin support substrate and also improves its wettability. This surface treatment process is conducted prior to forming the layer structure, which includes at least a signal recording layer, onto the surface of the thermoplastic resin support substance. The support substance is placed in an active gas atmosphere, such as ozone, followed by an inert gas atmosphere, such as nitrogen. This surface treatment process generates little deterioration in the support substrate surface.

16 Claims, 5 Drawing Sheets

METHOD FOR MANUFACTURING A RECORDING MEDIUM

CROSS-REFERENCE TO PRIOR APPLICATION

This application claims benefit under 35 U.S.C. §119 of Japanese patent application Ser. No. 2000-254415, filed Aug. 24, 2000, which is hereby incorporated by reference in its entirety.

BACKGROUND TO THE INVENTION

The present invention relates to a method for manufacturing a recording medium that has a layer structure with at least one layer of a signal recording layer on the surface of a support substrate comprising essentially of a thermoplastic resin. Described in more detail, the present invention relates to a recording medium manufacturing method having a surface treatment process that removes contamination on the surface of a thermoplastic resin support substrate and also improves its wettability. In addition, this surface treatment process generates little deterioration in the support substrate surface.

A hard disk, which is used as the main memory device for a computer, uses Al and glass and the like for a support substrate, and a layer structure, including a recording layer, is formed on this substrate surface. In general, the hard disk has a construction in which the recording layer is exposed at the surface. In addition, the head, which conducts recording and playback, is a non-contact type, but the head conducts recording and playback while moving at a height of 50 nm or less from the hard disk surface. Therefore, the smallest defects and contamination on the hard disk are problematic. Contamination on the hard disk can be due to peeling of the recording layer resulting from contact between the recording layer and the head, and it can be due to polishing dust resulting from the processing of the support substrate. In order to prevent the generation of this type of contamination, various attempts have been made to improve the adhesion between the recording layer and the support substrate. In addition, in order to remove the polishing dust, rinsing is conducted with a sponge and the like using pure water and surface active agents and the like.

When rinsing using a mechanical force in this way, the rinsing is inadequate particularly at the end surfaces of the substrate. Therefore, there has been developed a substrate rinsing method (Japanese Laid-Open Patent Number 5-143981) that has a process of placing the Al substrate in an ozone atmosphere and, at the same time, irradiating this substrate with ultraviolet light.

With advances in the development of resins with excellent shape stability, substrates that are easier to mold and are inexpensive compared to Al or glass can be manufactured. For this reason, there have been attempts to use substrates of an injection molded thermoplastic resin such as polycarbonate resin and polyolefin and the like as the support substrates for hard disks. Support substrates comprising essentially from thermoplastic resins generally have a low surface wettability. As a result, when a layer structure, which includes a recording layer, is formed on the substrate surface, the adhesion is poor, and peeling of the recording layer can easily occur due to contact between the recording layer and the head. Recording media that use substrates comprising of thermoplastic resin include magneto-optical disks, compact disks, and the like. However, with these recording media, they have structures in which the recording layer is not exposed at the surface. As a result, recording and playback is conducted through non-contact. Therefore, compared to hard disks in which the recording layer is exposed, contamination resulting from the peeling of the recording layer is not such a problem. However, with hard disks, this type of contamination must be eliminated.

However, compared to the traditional substrates of Al and glass, support substrates of thermoplastic resin are more easily damaged and absorb water more readily. As a result, the method of removing contamination on the substrate surface by rinsing with a sponge and the like using pure water and surface active agents and the like is not suitable. In addition, in Japanese Laid-Open Patent Publication 5-143981, there is simultaneous action of ozone and ultraviolet light. However, for support substrates made of thermoplastic resin, when using a rinsing method which does not have a process for aggressively stopping the action of ozone and ultraviolet light, not only will the surface contamination be removed, but there can be degradation of the substrate itself.

OBJECTS AND SUMMARY OF THE INVENTION

It is an object of the present invention to provide a recording medium manufacturing method that overcomes the foregoing problems.

It is a further object of the present invention to provide a recording medium manufacturing method having a surface treatment process that removes contamination from the surface of a thermoplastic resin support substrate.

It is another object of the present invention to provide a recording medium manufacturing method having a surface treatment process that improves the wettability of the surface of a thermoplastic resin support substrate.

In addition, this surface treatment process generates little deterioration of the support substrate surface.

A further object is to provide a recording medium that has good adhesion between the layer structure, which includes a recording layer, and the support substrate and that also conducts recording and playback well.

In order to achieve these objects, the present inventors discovered that by conducting surface treatment with an active gas and then rapidly terminating this surface treatment, the contamination of the support substrate surface can be removed and the wettability improved with little deterioration in the surface of the thermoplastic resin support substrate.

In other words, the manufacturing method for a recording medium of the first mode of the present invention is a manufacturing method for a recording medium that has a layer structure including at least one layer of a signal recording layer on a thermoplastic resin support substrate surface, comprising: a process for surface treating the support substrate prior to forming the layer structure on top of the support substrate; in the surface treatment process, surface treatment is conducted by placing the support substrate in an active gas atmosphere, and next, the surface treatment is stopped.

In addition, the manufacturing method for a recording medium of the second mode of the present invention is as described in the above manufacturing method, wherein: the surface treatment process results in a contact angle with water of the support substrate surface of 60 degrees or less; with the surface treatment process, the reduction in transmittance of 400 nm ultraviolet light compared to the support substrate prior to treatment is 10% or less.

Preferably, in the above manufacturing method, in the surface treatment process, the support substrate is placed in an active gas atmosphere, and next, the active gas atmosphere is replaced with an inert gas. In addition, the inert gas is preferably nitrogen, and the active gas is preferably ozone. Furthermore, the ozone can be generated by an ozone generator or by ultraviolet light irradiation.

In the above manufacturing method, the thermoplastic resin support substrate is a substrate of polycarbonate or polyolefin.

The above, and other objects, features, and advantages of the present invention will become apparent from the following description read in conjunction with the accompanying drawings, in which like reference numerals designate the same elements.

DETAILED DESCRIPTION OF THE INVENTION

Figure 1:
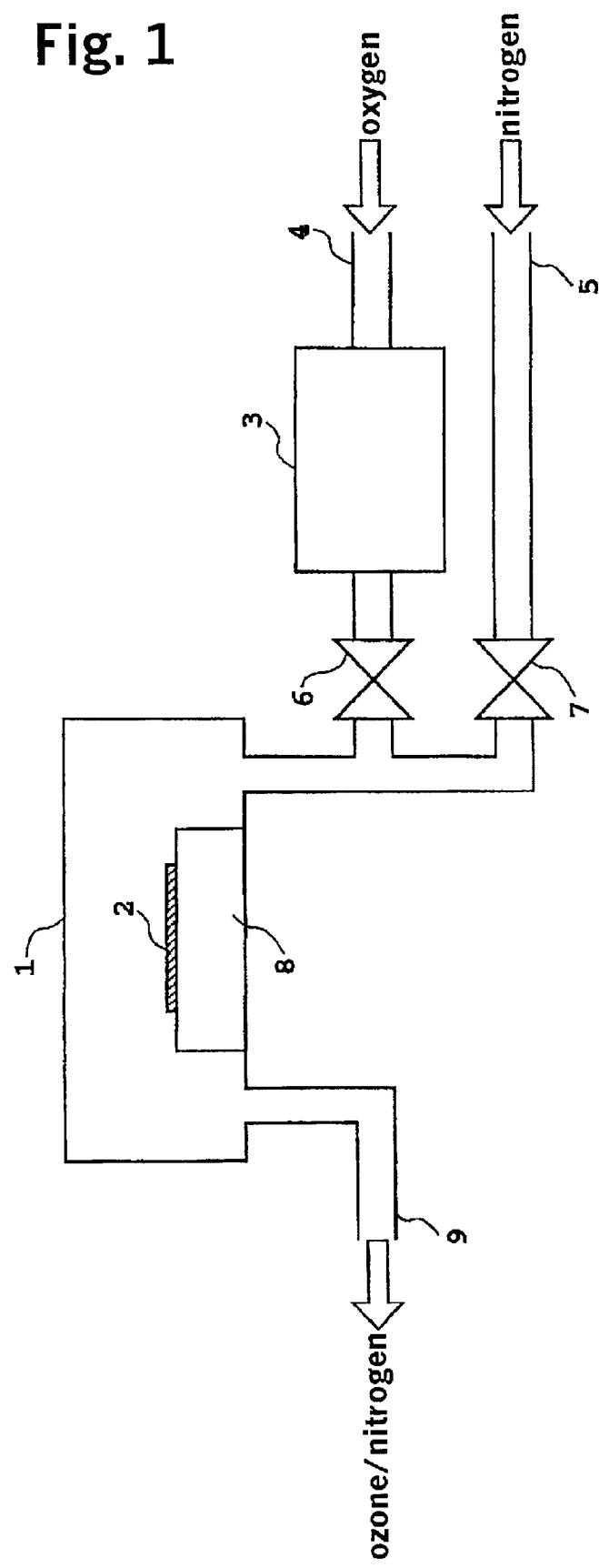
FIG. 1 is a schematic cross-sectional diagram of a surface treatment device that is suitable for use in the manufacturing method for the recording medium of the present invention and is equipped with an ozone generator.

According to the manufacture method for the recording medium of the present invention, before forming the layer structure on top of a support substrate, the surface of the support substrate is treated with an active gas.

The thermoplastic resin that constructs the substrate is a resin normally used for a substrate of an optical disk. Concrete examples include polycarbonate (PC), polyolefin, polymethyl methacrylate (PMMA), polysulfone, polyether imide, polyallylate, polyethylene terephthalate, polyethylene naphthalate, polyimide, and the like. However, they are not limited to these. In particular, polycarbonate and polyolefin are preferred.

The layer structure formed on top of the support substrate is a signal recording layer, but an undercoat layer can be provided between the recording layer and the substrate. There can also be a protective layer provided on top of the recording layer. Furthermore, the layer structure can be formed by a sequential, consecutive layering of a buffer layer, a seed layer, an undercoat layer, a recording layer, and a protective layer.

The buffer layer is a layer that can lessen damage to the plastic substrate surface caused by collision of film forming particles during film forming of the seed layer, or it is a layer that can lessen the difference in the expansion and contraction between the plastic substrate and the seed layer with the rise and fall in temperatures. A buffer layer having both of these functions is preferred.

The seed layer is a layer that improves the levelness of the surface of the magnetic recording medium and also improves the coercive force. Stated more concretely, the seed layer with these functions is of a metal film that contains Ti as a main component. The thickness of the seed layer is 5–50 nm, and it can be a single layer or a multi-layer.

The undercoat layer can be formed from any components that are commonly used to form an undercoat layer. Stated more concretely, the undercoat layer comprises Cr, Cr—W, Cr—V, Cr—Mo, Cr—Si, Ni—Al, $Co_{67}Cr_{33}$, Mo, W, Pt, $Al_2O_3$, and the like. The thickness of the undercoat layer is 50 nm or less, and it can be a single layer or a multi-layer.

The recording layer is a magnetic film containing a ferromagnetic metal. Preferably, it is of a magnetic film comprising ferromagnetic metal crystal grains and insulating material precipitated between the grains. When using a thermoplastic resin substrate, film formation cannot be conducted at high temperatures of greater than the glass transitional temperatures specific to the thermoplastic resin, generally approximately 100–300 degrees C. In order to achieve a high coercive force even with film formation temperatures near normal temperatures, a material in which insulating material is mixed in with ferromagnetic metal crystal grains is preferably used. Magnetic film, comprising ferromagnetic metal crystal grains and insulating material precipitated between the grains, is called a granular film. With granular films, for example with the Co magnetic film of the prior art, material in which a stable oxide such as $SiO_2$, $Al_2O_3$, $Cr_2O_3$, and the like is mixed in at several % to several 10's of % into a metal element such as Co, Cr, Ta, Pt, and the like is formed into a film by a sputtering method. A network structure in which the fine particles of Co magnetic material (these particles correspond to a single grain) are surrounded by the added oxide is formed. Compared to magnetic films constructed from only ferromagnetic metals of the prior art, the granular film is a thermally stable film with a relatively large coercive force even with a small particle size. In other words, this is a magnetic film with a high coercive force that can be formed at normal temperatures. Stated more concretely, this is a magnetic film having components such as Co—Cr—Pt, Co—Cr—Ta—Pt, CoCrTaPt—$Cr_2O_3$, CoPt—$SiO_2$, CoCrTaPt—$SiO_2$, $(Co_{60}Cr_{28}Pt_{12})$—$(Cr_2O_3)$, $(Co_{60}Cr_{28}Pt_{12})$—$(SiO_2)$, $(Co_{60}Cr_{28}Pt_{12})$—$(ZrO_2)$, $(Co_{60}Cr_{28}Pt_{12})$—$(TiO_2)$, $(Co_{60}Cr_{28}Pt_{12})$—$(Al_2O_3)$, and the like. Granular films of $(Co_{60}Cr_{28}Pt_{12})$—$(Cr_2O_3)$, $(Co_{60}Cr_{28}Pt_{12})$—$(SiO_2)$, $(Co_{60}Cr_{28}Pt_{12})$—$(ZrO_2)$, $(Co_{60}Cr_{28}Pt_{12})$—$(TiO_2)$, $(Co_{60}Cr_{28}Pt_{12})$—$(Al_2O_3)$ are particularly preferred. The thickness of the recording layer is 20 nm or less, and it can be a single layer or a multi-layer.

The protective layer has the function of protecting the magnetic film that forms the recording layer from impact with the head and corrosion from external corrosive substances. The protective layer can be formed from any of the common components that can provide such a function, and it is not restricted. Stated concretely, the protective layer is of carbon, nitrogen containing carbon, hydrogen containing carbon, and the like. The thickness of the protective layer is 10 nm or less, and it can be a single layer or a multi-layer.

When a layer structure is formed from various layers including a signal recording layer, before forming a layer that contacts the support substrate, surface treatment of the substrate using an active gas is conducted. It is preferable to conduct this surface treatment immediately before forming the layer.

The active gas that is used is not particularly restricted, but concrete examples include ozone and plasma.

Preferably, ozone is used. Ozone can be generated using an ozone generator. In addition, ozone can also be generated by shining ultraviolet light on oxygen.

In the manufacturing method for the recording medium of the present invention, a support substrate comprising essentially of thermoplastic resin is surface treated for a set amount of time with an active gas, and thereby, contamination on the substrate surface is removed without damaging the substrate. At the same time, because the substrate surface becomes hydrophilic, the wettability of the substrate surface also improves. In order to conduct surface treatment without damaging the substrate, it is preferred to rapidly terminate the surface treatment.

Surface treatment of the support substrate by the active gas is conducted by placing the support substrate in an active gas environment.

The treatment time with the active gas and the gas concentration is determined as appropriate depending on the type of thermoplastic resin constructing the substrate and the degree of contamination of the substrate surface. By selecting suitable treatment conditions, the contact angle with water of the support substrate surface is 60 degrees or less, and the transmittance of ultraviolet light of 400 nm is reduced by 10% or less of the support substrate prior to treatment. For the contact angle, three microliters of water is dropped onto a horizontal support substrate surface by a microsyringe, and the angle formed by the surface of the water droplet and the surface substrate is measured on the liquid side.

In addition, by rapidly terminating surface treatment, the reduction in transmittance of 400 nm ultraviolet light is easily made to be 10% or less with respect to the support substrate prior to treatment. The termination of the surface treatment is conducted by replacing the active gas environment with inert gas or air. By rapidly terminating the surface treatment of the substrate, the deterioration in the substrate itself is prevented.

The replacement of the active gas environment is preferably conducted using an inert gas. The inert gas is not particularly limited, but nitrogen is preferred.

Below, referring to the schematic diagrams of devices suitable for the present manufacturing method, the manufacturing method for the recording medium of the present invention is described in further detail.

Referring to FIG. 1, a schematic cross-sectional diagram of a surface treatment device equipped with an ozone generator is shown. A support substrate 2 that is to be treated is mounted onto a sample stand 8 provided on a treatment container 1. An ozone generator valve 6, which is provided between an ozone generator 3 and treatment container 1, is opened. Next, oxygen is supplied to ozone generator 3 from an oxygen supply pipe 4, which is connected to ozone generator 3, and ozone is generated. The inside of treatment container 1 is made into an ozone atmosphere. After a prescribed treatment time has passed, ozone generator valve 6 is closed. Next, a nitrogen valve 7, which is provided on a nitrogen supply pipe 5, is opened, and the supply of nitrogen is initiated so that the inside of treatment container 1 is replaced with nitrogen. When the inside of treatment container 1 becomes a nitrogen atmosphere, support substrate 2 is removed.

Figure 2:
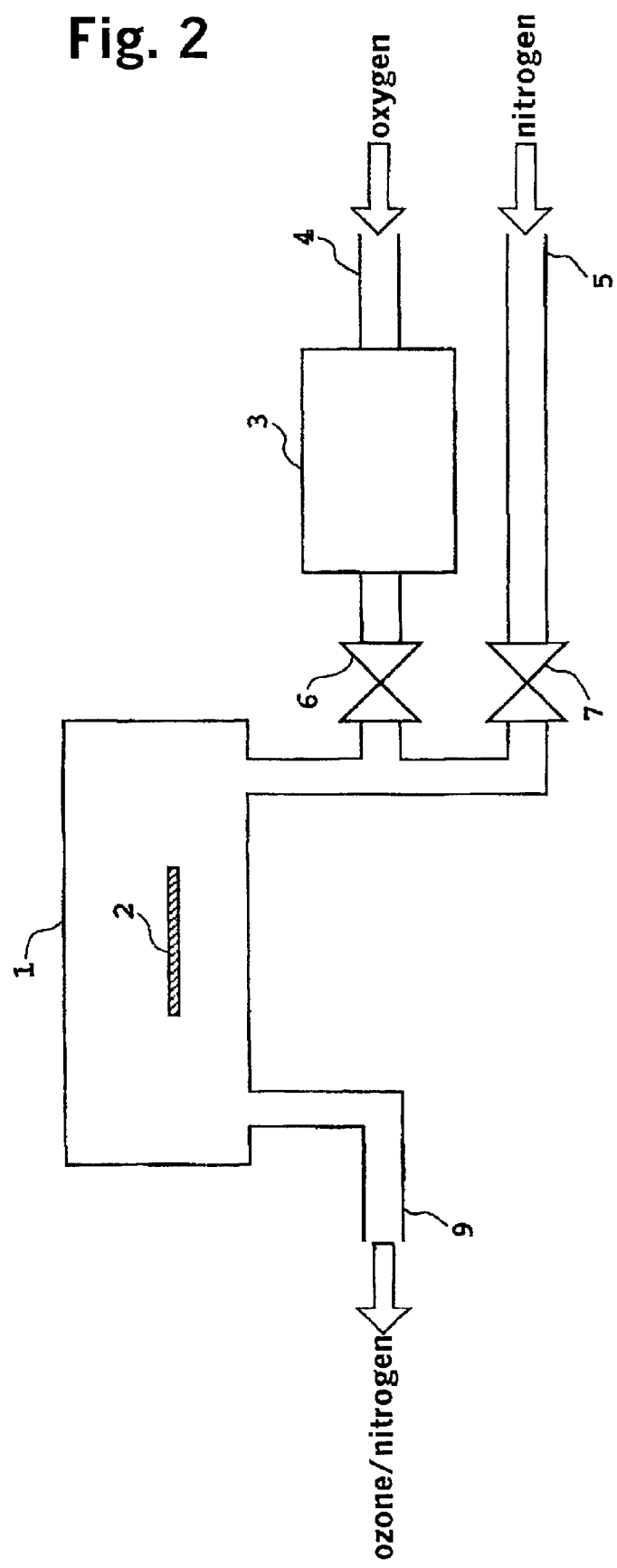
FIG. 2 is a schematic cross-sectional diagram of a surface treatment device that is for simultaneous treatment of both sides of a substrate and is suitable for use in the manufacturing method for the recording medium of the present invention and is equipped with an ozone generator.

Referring to FIG. 2, when both sides of the support substrate are to be surface treated simultaneously, the support substrate is not mounted onto a sample stand, but is held in a way that does not affect the treatment.

Figure 3:
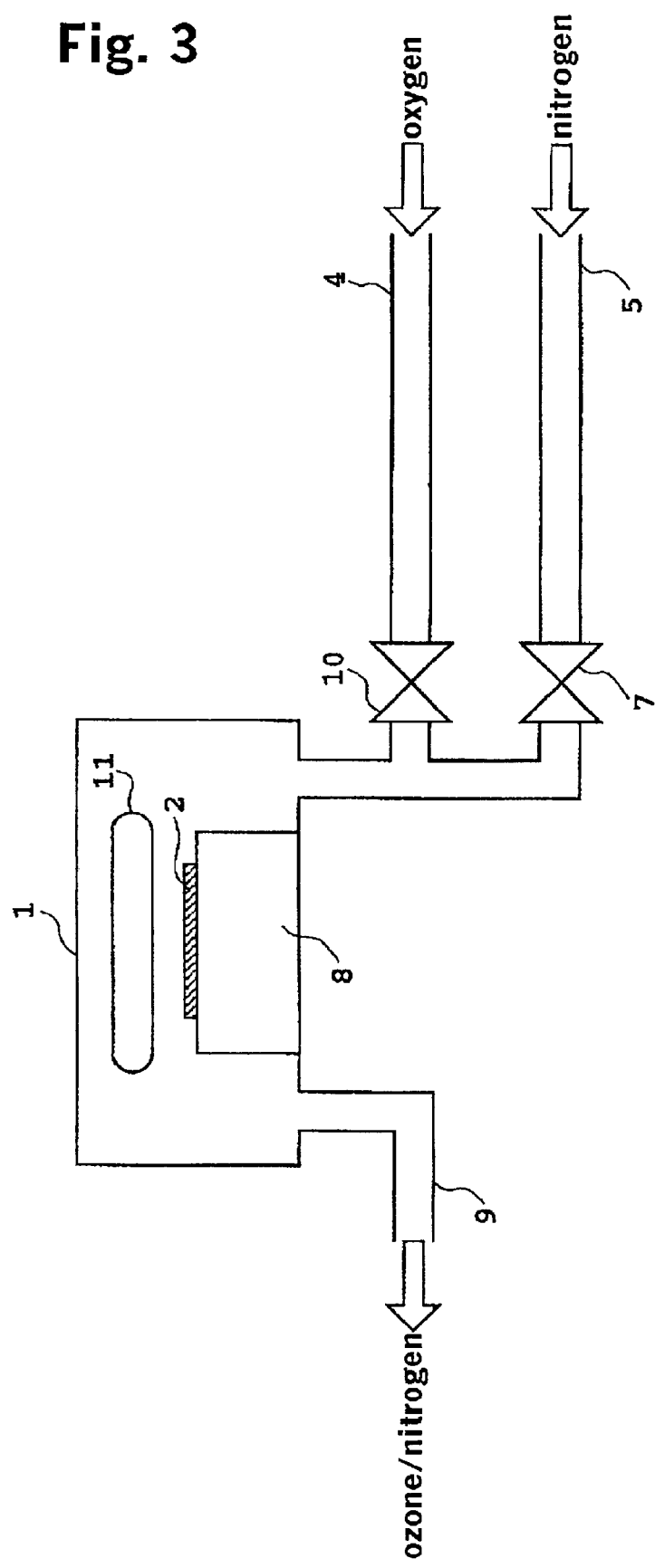
FIG. 3 is a schematic cross-sectional diagram of a surface treatment device that is suitable for use in the manufacturing method for the recording medium of the present invention and generates ozone by ultraviolet light irradiation.

Referring to FIG. 3, there is shown a schematic cross-sectional diagram of a surface treatment device in which ozone is generated by ultraviolet light irradiation. Support substrate 2 that is to be treated is mounted onto sample stand 8 provided on treatment container 1. An oxygen valve 10 provided on an oxygen supply pipe 4 is opened, and oxygen is introduced into the treatment container. Next, an ultraviolet lamp 11, which is provided inside treatment container 1, is turned on, and ozone is generated. The inside of treatment container 1 becomes an ozone atmosphere. After a prescribed treatment time has passed, ultraviolet lamp 11 is turned off, and oxygen valve 10 is closed. Next, nitrogen valve 7, which is provided a nitrogen supply pipe 5, is opened, and the supply of nitrogen is initiated so that the inside of treatment container 1 is replaced with nitrogen. When the inside of treatment container 1 becomes a nitrogen atmosphere, support substrate 2 is removed.

Figure 4:
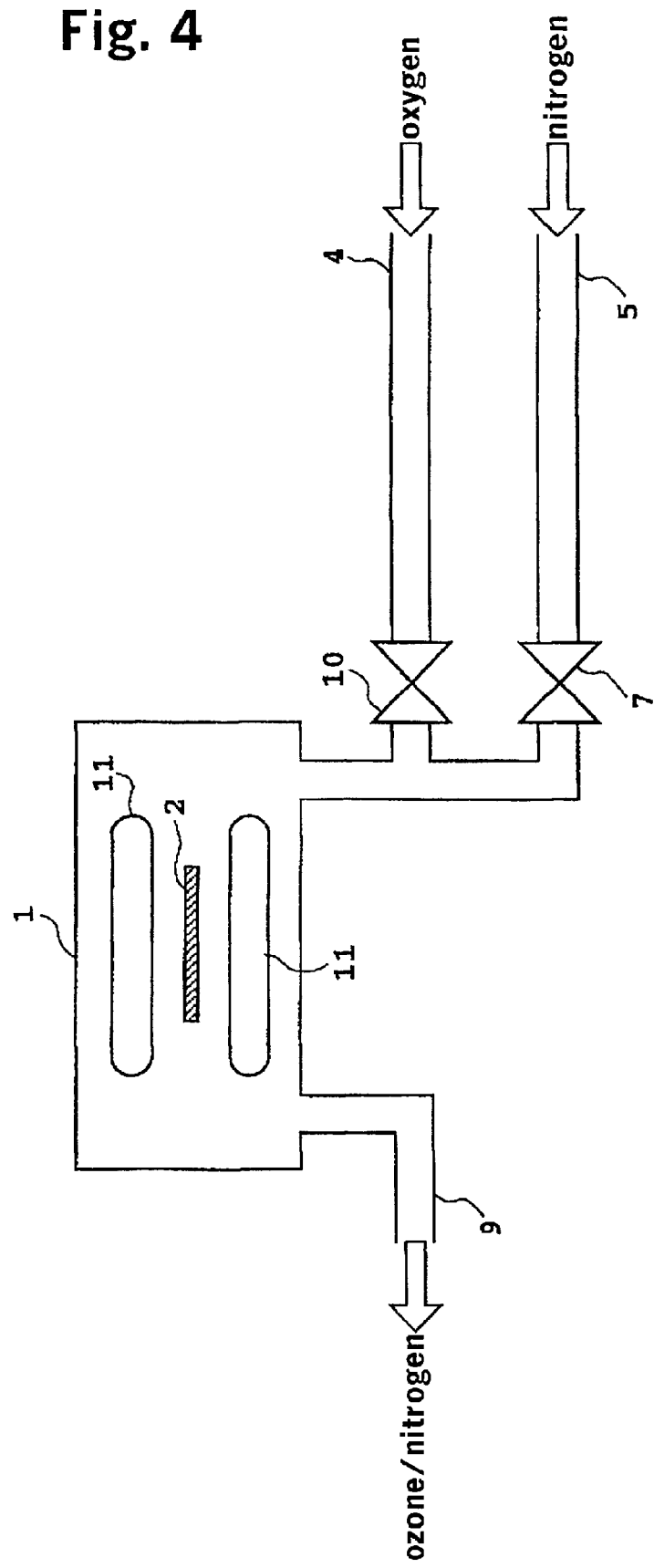
FIG. 4 is a schematic cross-sectional diagram of a surface treatment device that is for simultaneous treatment of both sides of a substrate and is suitable for use in the manufacturing method for the recording medium of the present invention and generates ozone by ultraviolet irradiation.

Referring to FIG. 4, when both sides of the support substrate are to be surface treated simultaneously, the substrate is placed between ultraviolet lamps 11. The support substrate is not mounted onto a sample stand, but is held in a way that does not affect the treatment.

Below, the present invention is described by citing embodiments, but the present invention is not limited to these embodiments.

Figure 5:
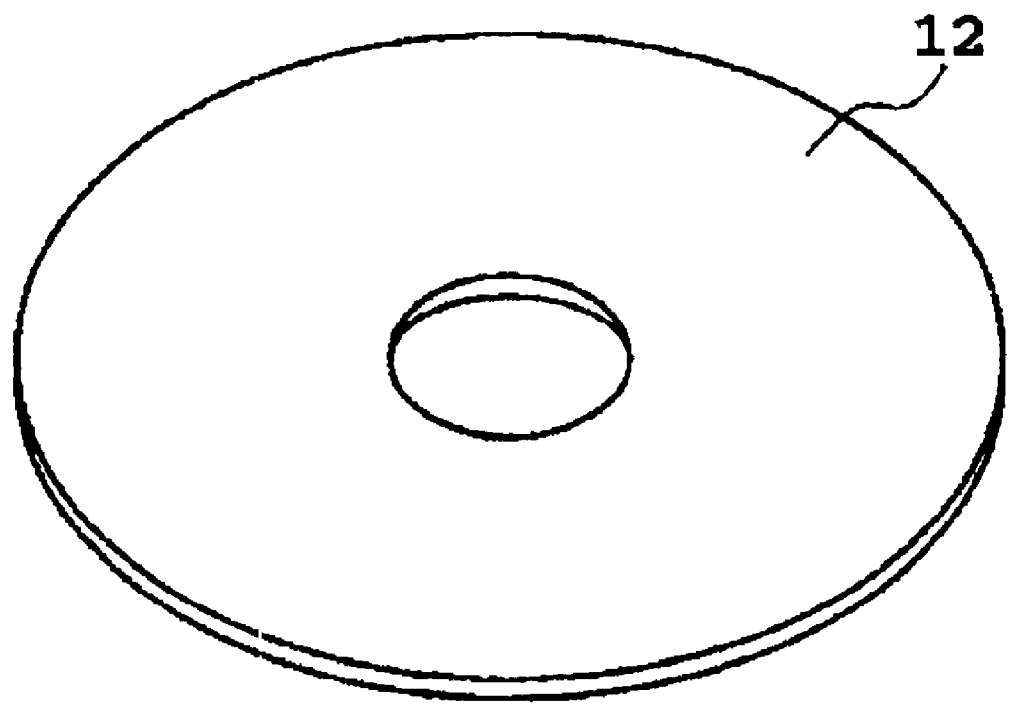
FIG. 5 is a perspective view of a circular substrate used as the support substrate in the Embodiments and Comparative examples of the present invention.

Referring to FIG. 5, there is shown a circular substrate 12 used as the support substrate in the embodiments and the comparative examples.

Embodiment 1

The surface treatment of a circular substrate of a polycarbonate resin was conducted using an UV Dry Stripper/Cleaner (Samco International product name "UV-1"), which is a device of a structure shown in FIG. 1. An ultraviolet lamp is installed on this device, but in the present embodiment, the device was used without lighting the lamp.

The supply rate for oxygen was 250 ml/minute. The supply time of oxygen was 20 seconds, 40 seconds, 60 seconds, 180 seconds, 300 seconds, and 480 seconds.

After each of the treatment times had passed, a contact angle measurement, a scratch test, and an ultraviolet light transmittance measurement were performed on the substrate.

For the contact angle measurement, 3 microliters of water was dropped by a microsyringe onto the support substrate surface, which was adjusted to be horizontal. The angle formed by the water droplet surface and the substrate surface on the liquid side was measured using a contact angle measurement device. The measurements were conducted on the substrate at five locations from the inner perimeter to the outer perimeter. The contact angles are an average of these five measurements and are shown in Table 1.

After conducting surface treatment of the substrate, a recording layer of CrMo/CoCrTaPt/C of film thickness 40 nm was formed, and next, the scratch test was conducted. For the scratch test, using a cutter, cuts were made to make a grid with an 1 mm spacing. In this grid, there were 10 squares per side for a total of 100 squares. Cellophane tape was placed on the grid, and the number of squares adhering to the tape when it was peeled was counted. The number of peeled squares are shown in Table 2.

For the ultraviolet light transmittance, the transmittance of ultraviolet light of 400 nm was measured. The measurement was conducted at two points, one on the inner perimeter and one on the outer perimeter of the substrate. Their average was obtained. The retention rate compared with the substrate with no surface treatment was obtained, and these are shown in Table 3.

Embodiment 2

The surface treatment of a circular substrate of a polycarbonate resin was conducted using an UV Dry Stripper/Cleaner (Samco International product name "UV-1"), which is a device of a structure shown in FIG. 3. An ozone generator is installed on this device, but in the present embodiment, the device was used after removing the ozone generator.

The supply rate for oxygen was 50 ml/minute. The supply time of oxygen was 20 seconds, 40 seconds, 60 seconds, 180 seconds, 300 seconds, and 480 seconds.

After each of the treatment times had passed, a contact angle measurement, a scratch test, and an ultraviolet light transmittance measurement were performed on the substrate in the same manner as Embodiment 1.

Embodiment 3

The surface treatment of a circular substrate of a polyolefin resin was conducted using an UV Dry Stripper/Cleaner (Samco International product name "UV-1"), which is a device of a structure shown in FIG. 1. An ultraviolet light lamp is installed on this device, but in the present embodiment, the device was used without lighting the lamp.

The supply rate for oxygen was 250 ml/minute. The supply time of oxygen was 20 seconds, 40 seconds, 60 seconds, 180 seconds, 300 seconds, and 480 seconds.

After each of the treatment times had passed, a contact angle measurement, a scratch test, and an ultraviolet light transmittance measurement were performed on the substrate in the same manner as Embodiment 1.

Embodiment 4

The surface treatment of a circular substrate of a polyolefin resin was conducted using an UV Dry Stripper/Cleaner (Samco International product name "UV-1"), which is a device of a structure shown in FIG. 3. An ozone generator is installed on this device, but in the present embodiment, the device was used after removing the ozone generator.

The supply rate for oxygen was 50 ml/minute. The supply time of oxygen was 20 seconds, 40 seconds, 60 seconds, 180 seconds, 300 seconds, and 480 seconds.

After each of the treatment times had passed, a contact angle measurement, a scratch test, and an ultraviolet light transmittance measurement were performed on the substrate in the same manner as Embodiment 1.

COMPARATIVE EXAMPLE 1

With a circular substrate of a polycarbonate resin with no surface treatment, a contact angle measurement, a scratch test, and an ultraviolet light transmittance measurement were performed in the same manner as Embodiment 1.

COMPARATIVE EXAMPLE 2

With a circular substrate of a polyolefin resin with no surface treatment, a contact angle measurement, a scratch test, and an ultraviolet light transmittance measurement were performed in the same manner as Embodiment 1.

TABLE 1

Contact angles (average values in degrees)

| | Treatment times (in seconds) | | | | | | |
|---|---|---|---|---|---|---|---|
| | 20 | 40 | 60 | 180 | 300 | 480 | 0 |
| Embodiment 1 | 36° | 33° | 29° | 27° | 24° | 20° | — |
| Embodiment 2 | 35° | 33° | 28° | 25° | 23° | 19° | — |
| Embodiment 3 | 36° | 34° | 30° | 28° | 25° | 18° | — |
| Embodiment 4 | 37° | 34° | 31° | 28° | 26° | 18° | — |
| Comparative example 1 | — | — | — | — | — | — | 90° |
| Comparative example 2 | — | — | — | — | — | — | 93° |

Comparing Embodiments 1 and 2 and Comparative example 1, which use the same substrate, and also comparing Embodiments 3 and 4 and Comparative example 2, which use the same substrate, all of the embodiments have contact angles of 60 degrees or less. It can be seen that wettability is improved.

TABLE 2

Scratch Test-number of squares peeled

| | Treatment time (in seconds) | | | | | | |
|---|---|---|---|---|---|---|---|
| | 20 | 40 | 60 | 180 | 300 | 480 | 0 |
| Embodiment 1 | 4 | 5 | 2 | 1 | 0 | 9 | — |
| Embodiment 2 | 5 | 5 | 1 | 0 | 1 | 7 | — |
| Embodiment 3 | 6 | 5 | 1 | 0 | 1 | 9 | — |
| Embodiment 4 | 6 | 4 | 2 | 1 | 2 | 8 | — |
| Comparative example 1 | — | — | — | — | — | — | 15 |
| Comparative example 2 | — | — | — | — | — | — | 13 |

Comparing Embodiments 1 and 2 and Comparative example 1, which use the same substrate, and also comparing Embodiments 3 and 4 and Comparative example 2, which use the same substrate, the embodiments have an improved adhesion between the support substrate and the recording layer.

However, when the treatment time was 480 seconds, as shown in Table 1, wettability was improved, but because of the deterioration in the substrate surface, the adhesion between the support substrate and the recording layer was starting to decline.

TABLE 3

Retention Rate4 (average value) of 400 nm ultraviolet light transmittance

| | Treatment time (in seconds) | | | | | |
|---|---|---|---|---|---|---|
| | 20 | 40 | 60 | 180 | 300 | 480 |
| Embodiment 1 | 98% | 97% | 96% | 94% | 92% | 85% |
| Embodiment 2 | 99% | 98% | 96% | 95% | 91% | 83% |
| Embodiment 3 | 99% | 99% | 97% | 94% | 93% | 81% |
| Embodiment 4 | 98% | 98% | 96% | 95% | 92% | 82% |

With all of the embodiments, when the treatment time was up to 300 seconds, the reduction in transmittance was maintained at 10% or less. However, when the treatment time was 480 seconds, the reduction in transmittance became large. With this, it can be seen that the substrate surface dramatically deteriorates when the treatment time is 480 seconds.

According to the manufacturing method for the recording medium of the present invention, removal of contamination on the substrate surface and improved wettability can be achieved with very little deterioration in the surface of the thermoplastic resin support substrate. Therefore, the recording medium manufactured by the method of the present invention has a good adhesion between the layer structure, which includes a recording layer, and the support substrate. Good recording and playback can be conducted.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a hard disk having a layer structure with at least one signal recording layer on a thermoplastic resin support substrate surface, comprising:

surface treating said support substrate by placing said support substrate in an active gas atmosphere, wherein said surface treating step is conducted prior to forming said layer structure on top of said support substrate.

2. A method for manufacturing a recording medium having a layer structure with at least one signal recording layer on a thermoplastic resin support substrate surface, comprising:

surface treating said support substrate by placing said support substrate in an active gas atmosphere, wherein said surface treating step is conducted prior to forming said layer structure on top of said support substrate, wherein:

said surface treating step results in a contact angle with water of said support substrate surface of 60 degrees or less; and said surface treating step results in a reduction in transmittance of 400 nm ultraviolet light, compared to said support substrate prior to treatment, of 10% or less.

3. A method for manufacturing a hard disk, as described in claim 1, wherein:

after said surface treating step in complete, said active gas atmosphere is replaced with an inert gas.

4. A method for manufacturing a hard disk, as described in claim 3, wherein said inert gas is nitrogen.

5. A method for manufacturing a recording medium, as described in claim 2, wherein:

after said surface treating step in complete, said active gas atmosphere is replaced with an inert gas.

6. A method for manufacturing a recording medium, as described in claim 5, wherein said inert gas is nitrogen.

7. A method for manufacturing a recording medium, having a layer structure with at least one signal recording layer on a thermoplastic resin support substrate surface, comprising:

surface treating said support substrate by placing said support substrate in an active gas atmosphere, wherein said surface treating step is conducted prior to forming said layer structure on top of said support substrate, wherein said active gas is ozone.

8. A method for manufacturing a recording medium, as described in claim 7, wherein said ozone is generated by at least one of an ozone generator and ultraviolet light irradiation.

9. A method for manufacturing a recording medium, as described in claim 2, wherein said active gas is ozone.

10. A method for manufacturing a recording medium, as described in claim 9, wherein said ozone is generated by at least one of an ozone generator and ultraviolet light irradiation.

11. A method for manufacturing a hard disk as described in claim 1, wherein said support substrate is a polycarbonate or polyolefin thermoplastic resin.

12. A method for manufacturing a recording medium as described in claim 2, wherein said support substrate is a polycarbonate or polyolefin thermoplastic resin.

13. A hard disk, having a layer structure with at least one signal recording layer on a thermoplastic resin support substrate surface, made by the process comprising:

surface treating said support substrate by placing said support substrate in an active gas atmosphere, wherein said surface treating step is conducted prior to forming said layer structure on top of said support substrate.

14. A recording medium, having a layer structure with at least one signal recording layer on a thermoplastic resin support substrate surface, made by the process comprising:

surface treating said support substrate by placing said support substrate in an active gas atmosphere, wherein said surface treating step is conducted prior to forming said layer structure on top of said support substrate, wherein:

said surface treating step results in a contact angle with water of said support substrate surface of 60 degrees or less; and said surface treating step results in a reduction in transmittance of 400 nm ultraviolet light, compared to said support substrate prior to treatment, of 10% or less.

15. A method for manufacturing hard disk having a layer structure with at least one signal recording layer on a thermoplastic resin support substrate surface, comprising:

surface treating said support substrate by placing said support substrate in an active gas atmosphere, wherein said surface treating is conducted prior to forming said layer structure with at least one signal recording layer on top of said support substrate.

16. A hard disk produced by the process of claim 15.

* * * * *